Jan. 11, 1966  R. J. BRYDEN ETAL  3,229,294
RADIO LOCATION SYSTEM
Filed April 1, 1963                     2 Sheets-Sheet 1

INVENTORS
BY RICHARD J. BRYDEN
JOHN G. RICHTER

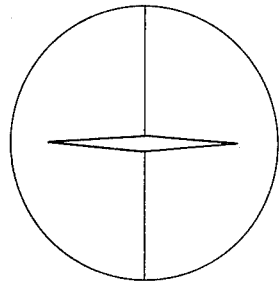
a. CHARACTERISTIC SIGNALS
   SELECTOR: PULSE
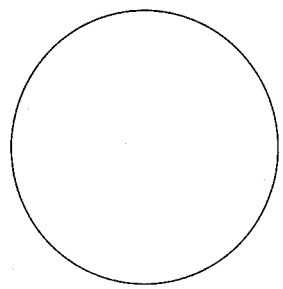
b. C.W. + A.M. SIGNALS
   SELECTOR: PULSE
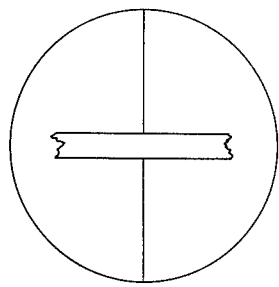
c. PURE C.W. SIGNALS
   SELECTOR: C.W.
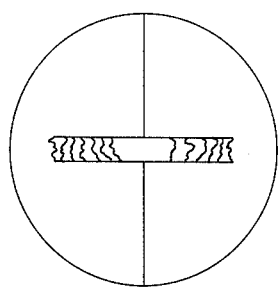
d. 400∿ MOD. C.W. SIGNALS
   SELECTOR: C.W.
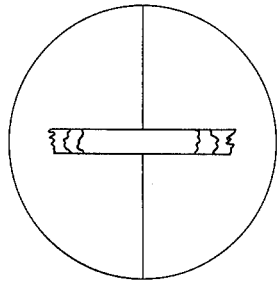
e. 1000∿ MOD. C.W. SIGNALS
   SELECTOR: C.W.
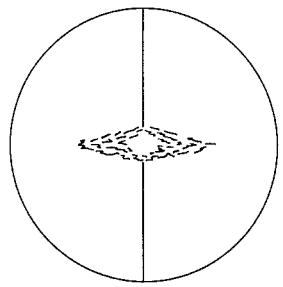
f. CHARACTERISTIC SIGNALS
   SELECTOR: C.W.
FIG. 3.
INVENTORS
BY RICHARD J. BRYDEN
   JOHN G. RICHTER
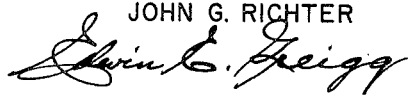

United States Patent Office 3,229,294
Patented Jan. 11, 1966

3,229,294
RADIO LOCATION SYSTEM
Richard J. Bryden, Bronx, and John G. Richter, Yonkers, N.Y., assignors to Simmonds Precision Products, Inc., Tarrytown, N.Y., a corporation of New York
Filed Apr. 1, 1963, Ser. No. 269,447
15 Claims. (Cl. 343—120)

This invention relates to radio locating apparatus.

In particular, this invention relates to apparatus embodying radio locating apparatus of the type described in U.S. patent specifications Nos. 2,841,787 and 2,841,788.

In these patent specifications there is described a form of radio location in which one or more transmitters or beacons are provided to define a given point or geographic positon and complementary receiving apparatus is provided which may be carried by a searching craft or the like.

In specification No. 2,841,787, a beacon is arranged to transmit groups of at least three pulses at successive predetermined intervals. The receiver includes two spaced antennae which feed a common superheterodyne receiver through first switching means which alternately and successively connect one and the other of the antennae to this superhetrodyne receiver.

The outpulses from this receiver are fed to a pulse amplitude discriminator through two paths, one path containing an adjustable time delay circuit and the other path bridging this delay circuit. The time delay circuit is adjusted so that the delay is equal to the spacing between two adjacent pulses in each group so that the second pulse of each group received by the discriminator consists of the summation of the second transmitted pulse in that group and the first (delayed) pulse in that group.

The discriminator is adjusted so that it only passes pulses the amplitudes of which are greater than that of a single transmitted pulse, and thus the first pulse to be passed through will be the second pulse in each of the groups. This latter pulse serves to trigger-off a time base generator which governs the Y axis sweep across a display tube.

The output pulses from the superheterodyne receiver are also fed through a second switching means, ganged to the first switching means, to govern an X axis deflection of the Y axis sweep across the display tube. The output from the second switching means is such that pulses received from one antenna cause displacement to one side of the Y axis trace and pulses received from the other antenna cause displacement to the other side of the Y axis trace.

The rate at which the first and second switching means is switched is such that the received pulses appear on the display tube as a continuous line normally intersecting the Y axis and a comparison of the amount by which the trace is deflected on both sides of the Y axis gives an indication of the direction of the beacon with respect to the searching craft.

Since the time-base is operated in synchronism with a specified one, i.e. the second one, of the received pulses, the succeeding pulse or pulses of the associated group always appear on the same portion of the display tube to give a repeated writing thereon which is readily distinguishable from background "noise."

In specification No. 2,841,788, there is disclosed apparatus for simultaneously locating a plurality of beacons on one display tube.

Each beacon is arranged to transmit groups of two pulses at successive predetermined intervals, the spacing between the two pulses in each group being peculiar to the beacon transmitting these pulses.

The circuitry in this apparatus is similar to that described with reference to specification No. 2,841,787, but in this case there is no provision for an amplitude discriminator, the time base generator being triggered by the first pulse of each of the received groups, the period of each sweep being such as to embrace the instant at which the second pulse in the associated group is received but not to extend into a period during which either of the pulses of the succeeding group are received.

In each of the above cases, the receiver is adapted to receive only characteristic pulses which are peculiar to a particular beacon.

It is an object of this invention to extend the utility of such a receiver so that it may operate to receive and display information other than that derived from the aforesaid characteristic pulses.

It is a further object of this invention to provide a receiver which is capable of receiving and displaying both continuous wave and amplitude modulated signals in addition to the aforesaid characteristic pulses.

It is a further object of this invention to provide an adaptor for a receiver of the above described type which will enable said receiver to receive and display both continuous wave and amplitude modulated signals in addition to the aforesaid characteristic pulses, without degradation of the performance of said receiver.

It is a further object of this invention to provide a radio-location system embodying an adaptor as aforesaid.

These and other objects of the invention will become apparent from the following description and drawings. It will be understood that the drawings are for the purpose of illustrating only one embodiment of the invention and should not be construed as defining the scope or limits of the invention.

In the drawings

FIGURES 3a–3f illustrate pictorially the indications produced on the display tube for various types of received signals when the searching craft is directly approaching a beacon.

Figures 1, 2:
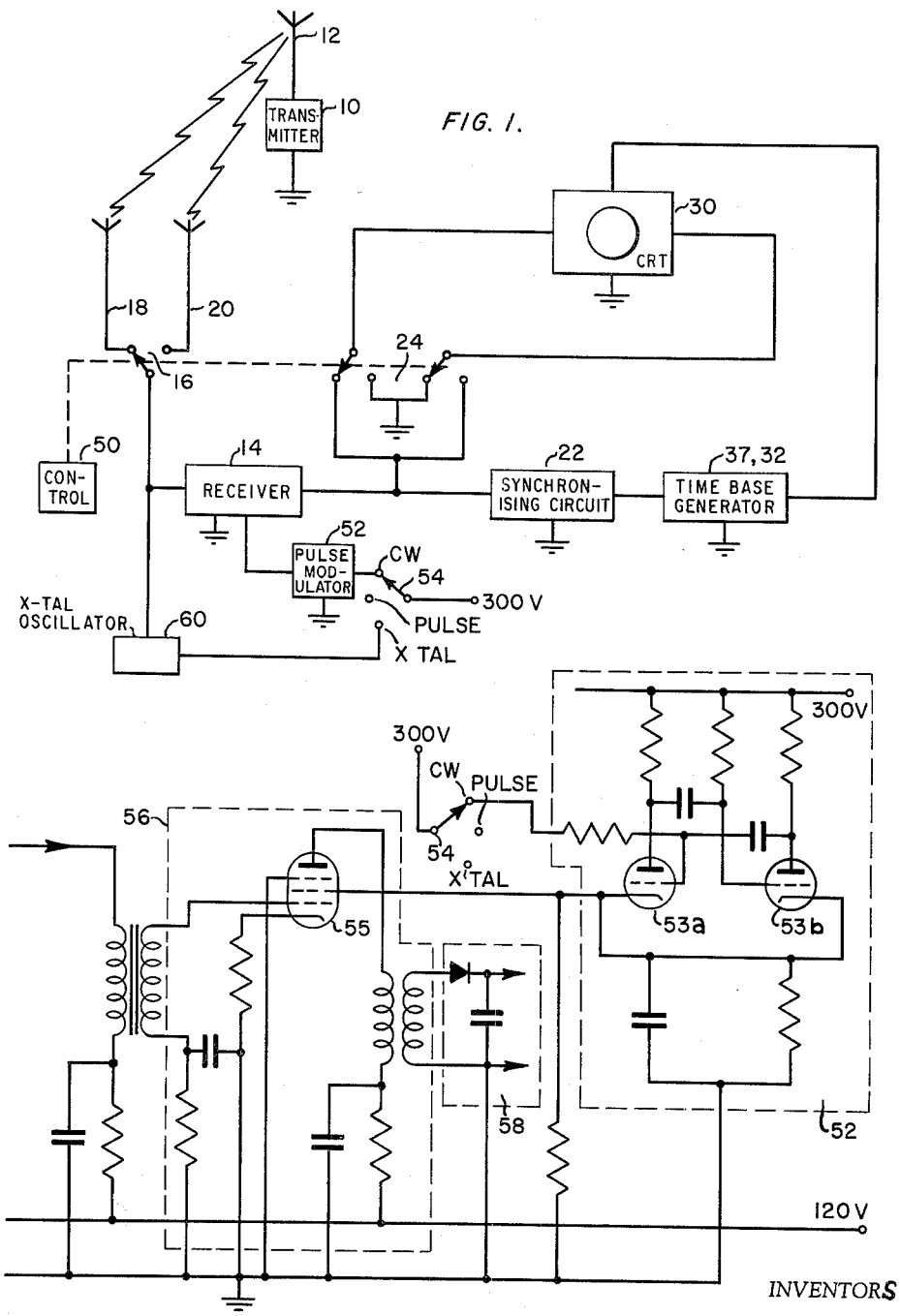
FIGURE 1 illustrates a block diagram of radio-location apparatus according to this invention.
FIGURE 2 illustrates in more detail part of the superheterodyne circuit shown in FIGURE 1 together with a pulse modulator according to this invention.

Referring now to FIGURE 1 there is illustrated radiolocation apparatus according to the invention, signals being transmitted from the antenna 12 of a radio transmitter 10.

The receiving circuit in this apparatus is similar to that described and illustrated in the aforesaid U.S. patent specification Nos. 2,841,787 and 2,841,788, and comprises a pair of antennae 18 and 20 coupled through a switch 16 to a superheterodyne receiver 14. The switch 16 is ganged to a further switch 24 located between the output of the receiver 14 and a display tube 30, and the ganged switches are governed by a common control means 50. The output of the receiver 14 is coupled also to a synchronising circuit 22 which in turn governs a time base generator 37 (or 32) for the Y axis sweep of the display tube 30.

In addition, however, there is provided a selector switch 54 and a pulse modulator 52 which is coupled to any one or number of intermediate frequency stages in the superheterodyne receiver 14. The selector switch 54 may be set to any one of three positions CW, PULSE and XTAL.

With the switch 54 set to CW, the pulse modulator 52 is connected to pulse modulate the receiver 14 as is more particularly described hereinafter.

With the switch 54 set to PULSE, the pulse modulator 52 is ineffective and the apparatus operates in a similar manner to that described in the said patent specifications.

With the switch 54 set to XTAL, a crystal oscillator 60 is rendered operative, the output of which is fed to the input of receiver 14, and this enables a check to be made on the standard operating parameters of the receiver and permits any adjustments to be made.

Those circuit elements in this figure which are similar to those described and illustrated in the aforesaid patent specifications are thus similarly referenced, and for a more complete understanding of the operation of these circuit elements reference may be made to these specifications.

Referring now to FIGURE 2 there is illustrated in more detail the manner in which the selector switch 54 and pulse modulator 52 are coupled to the superheterodyne receiver 14.

The pulse modulator 52 comprises a freely running astable, multivibrator having a pair of cathode-coupled triode tubes 53a, b (e.g. a 12AT7 tube), which multivibrator is connected to pulse modulate the screen grid of the pentode tube 55 in this case the last intermediate frequency stage 56 in the superheterodyne receiver 14 referred to in the aforesaid patent specifications.

The multivibrator is designed to have a 200 micro-second cycle, the tube being pulsed ON for 25 microseconds and pulsed OFF for 175 microseconds.

Thus, with the selector switch 54 set to CW, as illustrated, all signals received are pulse modulated and the signals passed on to the detector 58 are enclosed in an envelope the duration of which is 25 microseconds.

Continuous wave and amplitude modulated signals are therefore "mixed" with the multivibrator pulses and displayed on the oscilloscope 30 in a similar manner to the characteristic pulses utilized in the aforesaid patent specifications.

With the selector switch 54 set to PULSE, the multivibrator in the pulse modulator 52 is locked in an OFF position and a normal steady voltage developed across the common cathode of this multivibrator is applied to the screen grid of the tube 55. In this condition, as mentioned above, the apparatus operates in a similar manner to that described in the said patent specifications.

FIGURE 3a illustrates a typical display on the tube of the oscilloscope 30 under these conditions.

With the selector switch 54 set to PULSE, continuous wave and amplitude modulated signals are not capable of being displayed, and neither is the Y trace generated in the absence of the aforesaid characteristic pulses.

This condition is illustrated in FIGURE 3b merely for completeness.

With the selector switch set to CW (continuous wave) non-modulated continuous wave signals are displayed on the oscilloscope in the manner illustrated in FIGURE 3c.

FIGURES 3d and 3e respectively illustrate the display on the oscilloscope when 400 cycles/second and 1000 cycles/second modulated continuous wave signals are received with the selector switch set to CW.

An indication is also given on the oscilloscope in this position of the selector switch of the aforesaid characteristic pulses as is illustrated in FIGURE 3f.

Apparatus in accordance with the invention is therefore capable of receiving (1) the standard characteristic pulses referred to above
(2) continuous wave signals
(3) voice frequency signals
(4) tone modulated carrier signals.

It is readily apparent then, that the directional information for the CW and AM signals is identical to that obtained when the receiver is operating on PULSE.

The pulse modulator can conveniently be manufactured as an adaptor for existing receivers of the above described type, the requisite components therein being disposed within a self-contained housing.

Although there has been shown what is considered to be a preferred embodiment of the invention, it will be evident that many changes and modifications may be made without departing from the essential spirit of the invention. It is intended, therefore, in the annexed claims to cover all such changes and modifications as fall within the scope of the invention.

We claim:
1. In a radio location system of the type comprising
 a pulse transmitter for radiating groups of pulses characteristic of said transmitter,
 a pair of directive antennae for receiving said characteristic pulses,
 a superheterodyne receiver having an input and an output circuit,
 a cathode ray tube indicating device for indicating the location of said transmitter and having a pair of X trace electrodes and a pair of Y trace electrodes,
 an automatically operated switching mechanism comprising,
 a first movable contact connected to the input circuit of said superheterodyne receiver and movable alternately into electrical contact with different ones of said pair of directive antennae, and
 a second pair of movable contacts respectively electrically connected to said pair of X trace electrodes and alternately movable into electrical contact with the output circuit of said superheterodyne receiver,
 means coupling said first movable contact and said second pair of movable contacts for synchronizing movement of said contacts, and
 pulse-responsive means electrically connected to the output circuit of said superheterodyne receiver and having
 an output circuit electrically connected to the Y trace electrodes of said indicating device for generating said Y trace in response to said received pulses,
 the provision of an adaptor whereby the system can respond to transmitted signals other than said characteristic pulses, said adaptor comprising a
 pulse modulator electrically connected to said superheterodyne receiver for pulse modulating said signals so that said pulse-responsive means can respond thereto.

2. In a radio location system as claimed in claim 1, the provision of a selector switch having a movable contact electrically connected to a source of electrical supply and selectively movable between a first position establishing electrical contact with said pulse modulator whereby said indicating device indicates the location of the transmitter transmitting signals other than said characteristic pulses, and a second position whereby said pulse modulator is rendered inoperative and said indicating device indicates the location of the transmitter transmitting only said characteristic pulses.

3. A radio location system as claimed in claim 2, wherein the pulse modulator comprises an
 astable multivibrator having predetermined ON and OFF periods in each cycle thereof.

4. An adaptor for extending the class of signal to which a radio location system is responsive, said system being of the type comprising a transmitter for radiating groups of signals characteristic of said transmitter, a pair of directive antennae for receiving said characteristic signals, a superheterodyne receiver having an input and an output circuit, a cathode ray tube indicating device for indicating the location of said transmitter and having a pair of X trace electrodes and a pair of Y trace electrodes, an automatically operated switching mechanism comprising a first movable contact connected to the input circuit of said superheterodyne receiver and movable alternately into electrical contact with different ones of said pair of directive antennae, and a second pair of movable contacts respectively electrically connected to said pair of X trace electrodes and alternately movable into electrical contact with the output circuit of said superheterodyne receiver, means coupling said first movable contact and said second pair of movable contacts for synchronizing movement of said contacts, and pulse-responsive means electrically connected to the output circuit of said superheterodyne receiver and having an output circuit electrically connected to the Y trace electrodes of said indicating device for generating said Y trace in response to received pulses, said adaptor comprising a pulse generator electrically connected to said superheterodyne receiver for pulse modulating said signals so that said pulse-responsive means can respond thereto.

5. An adaptor for extending the class of signals to which a radio location system is responsive, said system being of the type comprising a transmitter for radiating groups of signals characteristic of said transmitter, and a receiver comprising, antenna means for receiving said radiated signals, circuit means connected to an input of said antenna means and responsive to said received signals, and a display device connected to an output of said circuit means for providing a visual indication of the relative direction of said transmitter, said adaptor comprising a pulse generator connected to said circuit means for pulse modulating signals received by said antenna means so that said circuit means are responsive thereto, and a selector switch for selectively connecting said adaptor to said circuit means in dependence on the class of signals in respect of which directional information is required.

6. A radio location system comprising, a transmitter for radiating signals characteristic of said transmitter, a receiver comprising, direction-finding antennae, circuit means electrically connected to said antenna and responsive to signals received by said antennae, a display device connected to said circuit means and responsive to pulsed signals from said circuit means for providing an indication of the relative direction of said transmitter, a pulse generator for pulse modulating said signals to which said circuit means are responsive, and a selector switch for selectively connecting said pulse generator to said circuit means.

7. A radio location system according to claim 6, wherein said direction-finding antennae comprise a pair of directive antennae spaced apart from each other, said system further comprising switching means for alternately connecting one and the other of said antennae to said circuit means and said display device.

8. A radio location system according to claim 7, wherein said switching means comprise a first switch for alternately connecting one and the other of said antennae to said circuit means and a second switch movable in synchronism with said first switch for alternately connecting to said display device the signals to which said circuit means responds so that said device indicates two values respectively indicative of the direction of the transmitter in relation to the two antennae.

9. A radio location system according to claim 8, wherein said display device comprises a cathode ray tube having a pair of Y trace and a pair of X trace electrodes and having a rectilinear Y trace generated thereon only in response to the receipt of said characteristic signals, said second switch alternately connecting the signals to which said circuit means respond to opposite ones of said X trace electrodes whereby the values are manifested as lateral deflections of said Y trace.

10. A radio location system comprising a transmitter for radiating signals characteristic of said transmitter, a receiver comprising a pair of direction-finding antennae, a superheterodyne receiver having an input circuit and an output circuit, a pulse-responsive display device for visually displaying information indicative of the location of said transmitter, control means connected to the output of said superheterodyne receiver for governing the operation of said display device in dependence upon signals manifested at the output of said superheterodyne receiver, switching means comprising a first switch for alternately connecting the signals received by the one and the other of said pair of antennae to the input of said superheterodyne receiver, and a second switch movable in synchronism with said first switch for alternately connecting the signals manifested at the output of said superheterodyne receiver, and respectively associated with the signals received by the one and other antennae, to said display device, and a pulse modulator connected to said superheterodyne receiver and selectively operable to pulse modulate signals fed to said receiver from said antennae so that said pulse-responsive display device is operable to respond to said pulse modulated signals and display information indicative of the location of the transmitter from where said signals emanated.

11. A radio location system according to claim 10, wherein said display device comprises a cathode ray tube, wherein said control means generates a rectilinear trace across said tube in dependence on said signals manifested at the output of said superheterodyne receiver, and wherein said second switch connects said signals at the output of the superheterodyne receiver so that alternate ones of the signals deflect said rectilinear trace to one and the other side thereof, respectively.

12. A radio location system according to claim 11, wherein said superheterodyne receiver comprises a plurality of intermediate frequency states and a detector circuit connected to the ultimate one of said stages, and wherein said pulse modulator is selectively operable to pulse modulate said any or all of said stage or stages.

13. A radio location system according to claim 12, wherein said pulse modulator comprises an astable multivibrator connected to said ultimate one of the intermediate frequency stages, said system further comprising a selector switch for selectively rendering said multivibrator operable in dependence on the class of signals transmitted by said transmitter.

14. A radio location system according to claim 13, wherein said selector switch is movable between a first position in which said multivibrator is inoperative whereby said display tube is capable of displaying information indicative of only pulsed signals received by said antennae, and a second position in which said multivibrator is operative whereby said display tube is capable of displaying information indicative of signals received by said antennae and belonging to any one class of signals selected from the group comprising: continuous wave signals, voice frequency signals and tone modulated carrier signals.

15. A radio location system according to claim 14, wherein said selector switch is movable between said first and said second position and a third position in which said multivibrator is inoperative, said system further comprising a standard frequency oscillator connected to the input of said superheterodyne receiver in said third position of the selector switch for permitting calibration and adjustment of said receiver.

References Cited by the Examiner

UNITED STATES PATENTS 2,312,203    2/1943    Wallace.

FOREIGN PATENTS 836,687    6/1960    Great Britain.

CHESTER L. JUSTUS, *Primary Examiner.*

LEWIS H. MYERS, *Examiner.*

H. C. WAMSLEY, *Assistant Examiner.*